Feb. 2, 1943.  P. M. CURRIER  2,310,066
ELECTRICAL REGULATING APPARATUS
Filed April 28, 1941
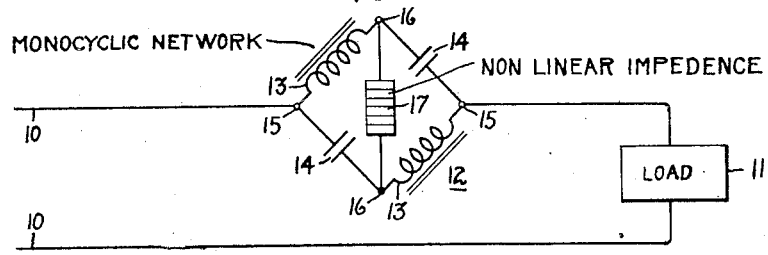
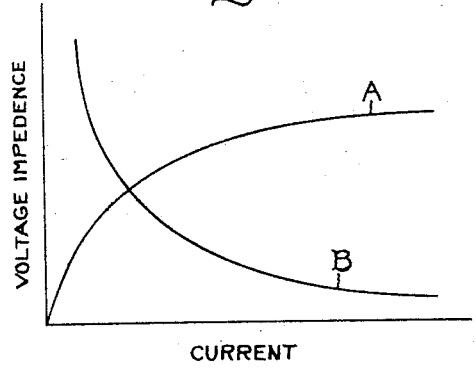
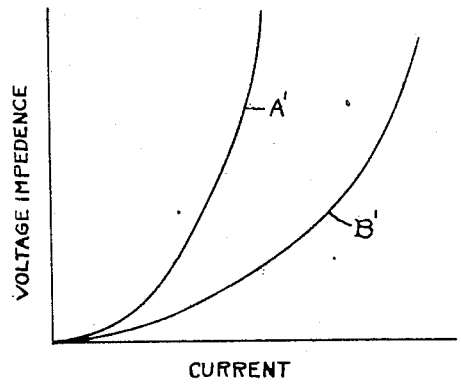
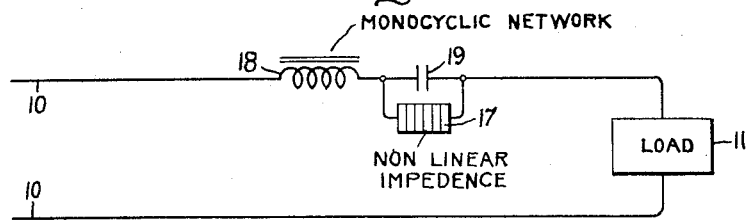
Inventor:
Philip M. Currier,
by Harry E. Dunham
His Attorney.

Patented Feb. 2, 1943

2,310,066

UNITED STATES PATENT OFFICE 2,310,066

ELECTRICAL REGULATING APPARATUS

Philip M. Currier, Ballston Spa, N. Y., assignor to General Electric Company, a corporation of New York Application April 28, 1941, Serial No. 390,759

5 Claims. (Cl. 171—229)

My invention relates to electrical regulating apparatus and more particularly to apparatus for regulating the flow of current in alternating current circuits.

In alternating current load circuits it is common to connect a protective impedance, such as a reactor, in the circuit to reduce the flow of current under short circuit conditions and thereby prevent damage which would otherwise occur due to excessive current flow. If the impedance value of the impedance is sufficient to give adequate protection under short circuit conditions the flow of normal current through the impedance, especially at low power factors, causes a voltage drop thereacross which is undesirable since it adversely affects the voltage regulation in the circuit.

An object of my invention is to provide improved current limiting means for an alternating current circuit.

It is a further object of my invention to provide improved current limiting apparatus for an alternating current circuit which has a low impedance for normal current flow so that the voltage regulation of the circuit is not adversely affected but which has a higher impedance for current values above normal whereby adequate short circuit protection is afforded.

A still further object of my invention is to provide means for interchanging the voltage-current relation of a non-linear impedance.

According to my invention, I connect the input terminals of a constant potential to constant current converter or transforming means in series with an alternating current load circuit and connect across the output terminals an impedance having a negative impedance current characteristic. A well known form of constant potential to constant voltage converter makes use of reactances of opposite sign and is known generally as a monocyclic network. Various forms of monocyclic networks are shown, for example, in Boucherot Patent No. 548,511 of October 22, 1895, and Steinmetz Patent No. 706,607 of August 12, 1902. Such networks have the known property that the voltage-current relations between the input and output circuits are reversed so that variations of potential in the input circuit appear as corresponding variations of current in the output circuit and similarly variations of current in the input circuit appear as corresponding variations in potential in the output circuit. In my invention the converter functions to interchange the voltage-current relation between the input and output circuits so that the negative impedance-current characteristic of the output circuit is reflected back to the input circuit as a positive impedance-current characteristic which is a desired relation in order to prevent excessive flow of current in the alternating current circuit. Thus, by the use of the constant potential constant to current converter I am able to utilize the characteristics of a negative impedance-current characteristic impedance to obtain an impedance having the reverse characteristics, or, in other words, a positive impedance-current characteristic. This is desirable because non-linear impedances having the desired operating characteristics from the standpoint of rapidity of operation, temperature independence, etc., have negative impedance-current characteristics.

My invention will be better understood by reference to the following description taken in connection with the accompanying drawing and its scope will be pointed out in the appended claims.

In the drawing Fig. 1 is a diagrammatic showing of an embodiment of my invention utilizing a constant voltage to constant current converter in the form of a monocyclic square; Figs. 2 and 3 are certain graphical representations useful in explaining the operation of my invention; and Fig. 4 is a modification of the arrangement illustrated in Fig. 1 utilizing a modified form of monocyclic network.

For the purpose of illustrating an application of my invention, I have illustrated in Fig. 1 of the drawing an alternating current circuit 10 connected to supply a load 11. For the purpose of preventing excessive current flow in the alternating current circuit 10 during a short circuit condition, I have illustrated connected in series with the circuit a monocyclic network indicated generally at 12. The monocyclic network 12, which in the single phase form shown is often referred to as a monocyclic square, is made up of two inductive reactances 13 and two capacitive reactances 14 alternately connected in a loop or square. All four reactances are substantially equal at the frequency at which the alternating current circuit normally operates. The monocyclic square has diagonal or non-adjacent input terminals 15 and diagonal or non-adjacent output terminals 16, the input terminals 15 being connected in series with the alternating current circuit 10. Connected across the output terminals 16 of the monocyclic network is a non-linear impedance 17 having a negative impedance-current characteristic. By negative impedance-current characteristic impedance I mean an impedance whose ohmic value decreases with increases of current therethrough or voltage thereacross. While my invention is not limited to the use of any particular type of non-linear impedance, I at present prefer to use the special ceramic material which is disclosed and claimed in Patent 1,822,742, granted September 8, 1931, on the application of K. B. McEachron and assigned to the assignee of the present application. This material has the property of substantially instantaneously reducing its electrical resistance with increases in current through it or voltage across it and its resistance is substantially independent of its temperature. If desired, however, other non-linear impedances may be used such as, for example, the combination of a saturating reactor and capacitor connected either in series or parallel.

The operation of my invention will be best understood by reference to Figs. 2 and 3 of the drawing which show respectively the voltage-current and the impedance-current relations of the output and input circuits of the monocyclic network 12 with the negative impedance-current characteristic impedance 17 connected across the output terminals 16. In Fig. 2 the curve A indicates that as the voltage of the output circuit increases there is a disproportionate increase in the current. This is due to the negative impedance-current characteristic of the impedance 17 as indicated by the curve B. In Fig. 3 of the drawing the curve A' shows that as the current in the input circuit of the monocyclic network increases there is a disproportionate increase in the voltage drop across the input circuit. This is due to the positive impedance current characteristic of the input circuit as indicated by the curve B'. It will be noted that the A' curve in Fig. 3 is similar to the A curve shown in Fig. 2 except that the voltage and current relations are reversed. This is due to the action of the monocyclic network which, as pointed out before, has the known property of converting the voltage variations of the input circuit into corresponding current variations of the output circuit and similarly current variations of the input circuit into corresponding voltage variations of the output circuit. The curve B' in Fig. 3 indicates the variation of the impedance of the monocyclic network with variations in current therethrough as viewed from the input circuit. It will be seen that for normal or low current values the network offers a very low impedance to the passage of current in the load circuit so that the voltage drop thereacross is low and the voltage regulation of the load circuit is not adversely affected thereby. However, for abnormally high current conditions in the alternating current circuit such as would tend to occur under short circuit conditions, the impedance of the network becomes very high so that the network becomes a current limiting means acting to prevent further rise of current in the alternating current circuit to a dangerously high value.

Most non-linear impedance elements having the desired operating characteristics from a standpoint of rate of change of impedance with a change of voltage thereacross or current therethrough have negative impedance-current characteristics so they cannot by themselves be used as current limiting impedances. By the use of a constant voltage to constant current converter such as a monocyclic network the impedance-current characteristics of these desirable non-linear impedances may be reversed so that the overall impedance current characteristic of the combination is a positive impedance current characteristic whereby the combination can be used as a current limiting device.

In Fig. 4 of the drawing I have shown a modification utilizing a simplified form of monocyclic network. In this modification the network comprises but one inductive element 18 and one capacitive element 19 connected in series with each other and in series with the alternating current circuit 10. The impedance 17 is shown as being connected across the capacitive element 19 but it may equally well be connected across the inductive element 18. The function of the monocyclic network in this modification is the same as that described in connection with Fig. 1. Other well known forms of monocyclic networks may be used and I do not wish to be limited to the specific forms illustrated.

While I have shown and described particular embodiments of my invention, it will occur to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current supply circuit, an electrical load connected in series with said circuit, current limiting means for preventing excessive current flow in said circuit upon a decrease in impedance of said load, said current limiting means comprising a monocyclic network having input terminals and output terminals, said input terminals being connected in series with said circuit and a negative impedance-current characteristic impedance connected across said output terminals.

2. In combination, an alternating current supply circuit, an electrical load connected in series with said circuit, current limiting means for preventing excessive current flow in said circuit upon a decrease in impedance of said load, said current limiting means comprising a monocyclic network having input terminals and output terminals, said input terminals being connected in series with said circuit, and a substantially instantaneously acting negative resistance-current characteristic resistance connected across said output terminals.

3. In combination, an alternating current supply circuit, an electrical load connected in series with said circuit, means for preventing excessive current flow in said circuit upon a large decrease in impedance of said load such as would occur if the load became short circuited, said means comprising a monocyclic square having input terminals and output terminals, said input terminals being connected in series with said circuit and a negative impedance current characteristic impedance connected across said output terminals.

4. In combination, an alternating current supply circuit, an electrical load connected to be supplied by said circuit, current limiting means for preventing excessive flow of current in said circuit upon a decrease in impedance of said load, said current limiting means comprising an inductance element, a capacative element and a non-linear impedance having a negative impedance-current characteristic, said capacitive and inductance elements having equal reactance values at the normal operating frequency of said supply circuit and being connected in series circuit relation with said load in said supply circuit and said non-linear impedance being connected in parallel with one of said elements.

5. In combination, an alternating current supply circuit, an electrical load connected to be supplied by said circuit, current limiting means for preventing excessive flow of current in said circuit upon a decrease in impedance of said load, said current limiting means comprising an inductance element, a capacitive element and a substantially instantaneously acting negative resistance-current characteristic resistance, said capacitive and inductance elements having equal reactance values at the normal operating frequency of said supply circuit and being connected in series circuit relation with said load in said supply circuit and said resistance being connected in parallel with one of said elements.

PHILIP M. CURRIER.